US010540736B2

(12) United States Patent
Nadampalli et al.

(10) Patent No.: US 10,540,736 B2
(45) Date of Patent: Jan. 21, 2020

(54) DISPLAY SUB-SYSTEM SHARING FOR HETEROGENEOUS SYSTEMS

(71) Applicant: Texas Instruments Incorporated, Dallas, TX (US)

(72) Inventors: Sunita Nadampalli, McKinney, TX (US); Anish Reghunath, Plano, TX (US); Brian Okchon Chae, Johns Creek, GA (US); Jonathan Elliot Bergsagel, Richardson, TX (US); Gregory Raymond Shurtz, Houston, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 76 days.

(21) Appl. No.: 15/668,453

(22) Filed: Aug. 3, 2017

(65) Prior Publication Data
US 2019/0043153 A1 Feb. 7, 2019

(51) Int. Cl.
G06T 1/20 (2006.01)
G06F 3/06 (2006.01)
(Continued)

(52) U.S. Cl.
CPC .............. G06T 1/20 (2013.01); G06F 3/0641 (2013.01); G06F 3/0655 (2013.01); G06F 9/544 (2013.01);
(Continued)

(58) Field of Classification Search
CPC ........... G06T 15/005; G06T 1/20; G06T 1/60; G06T 2210/52; G06T 1/00; G09G 5/363;
(Continued)

(56) References Cited

U.S. PATENT DOCUMENTS 4,479,179 A * 10/1984 Dinwiddie, Jr. ...... G06F 13/282
710/25
5,381,540 A * 1/1995 Adams .................... G06F 13/26
710/261
(Continued)

OTHER PUBLICATIONS

"DRA72x Infotainment Applications Processor Silicon Revision 2.0", DRA722, DRA724, DRA725, DRA726, Texas Instruments, Inc., SPRS956B, Mar. 2016, Revised Jan. 2017, pp. 1-8.
(Continued)

Primary Examiner — Sultana M Zalalee
(74) Attorney, Agent, or Firm — Ebby Abraham; Charles A. Brill; Frank D. Cimino

(57) ABSTRACT

An integrated circuit includes a display sub-system that has a plurality of image processing resources and control logic. The image processing resources include a plurality of image processing pipelines configured to operate in parallel, overlay logic coupled to receive image data from the plurality of image processing pipelines, and an image output port coupled to an output of the overlay logic with image data outputs configured to couple to one or more display devices. The control logic is dynamically configurable to assign each of the image processing resources to a selected one of a first control port and a second control port. The first control port is configured to be controlled exclusively by a first processor and the second control port is configured to be controlled exclusively by a second processor.

17 Claims, 8 Drawing Sheets

(51) Int. Cl.
*G06F 9/54* (2006.01)
*H04N 21/4143* (2011.01)
*H04N 5/44* (2011.01)

(52) U.S. Cl.
CPC ... *H04N 21/4143* (2013.01); *H04N 2005/443* (2013.01)

(58) Field of Classification Search
CPC .. G09G 3/2088; G09G 2360/06; G09G 5/393; G09G 2360/18; G09G 2340/10; G09G 2340/125; G09G 2360/10; G09G 5/001; G06F 3/14; G06F 3/1423; G06F 9/3885; G06F 15/8007; H04N 21/44004
See application file for complete search history.

(56) References Cited

U.S. PATENT DOCUMENTS

| | | | | |
|---|---|---|---|---|
| 5,850,555 A * | 12/1998 | Qureshi | ............... | G06F 13/24 710/260 |
| 6,184,906 B1 * | 2/2001 | Wang | ............... | G06F 3/14 345/506 |
| 6,212,633 B1 * | 4/2001 | Levy | ............... | H04L 12/40104 380/283 |
| 6,853,355 B1 * | 2/2005 | Kang | ............... | H04N 5/45 345/2.2 |
| 7,363,407 B2 * | 4/2008 | Oshins | ............... | G06F 9/4812 710/260 |
| 7,400,333 B1 * | 7/2008 | Trottier | ............... | G06F 3/1438 345/603 |
| 8,504,750 B1 * | 8/2013 | Sonksen | ............... | G06F 13/36 710/243 |
| 2001/0037426 A1 * | 11/2001 | Pawlowski | ............... | G06F 13/24 710/260 |
| 2002/0023179 A1 * | 2/2002 | Stanley | ............... | G06F 9/4411 710/8 |
| 2004/0236879 A1 * | 11/2004 | Croxford | ............... | G06F 13/24 710/48 |
| 2005/0078694 A1 * | 4/2005 | Oner | ............... | G06F 13/4027 370/412 |
| 2005/0080942 A1 * | 4/2005 | Ogilvie | ............... | G06F 13/28 710/22 |
| 2006/0082569 A1 * | 4/2006 | Noorbakhsh | ............... | G09G 5/006 345/211 |
| 2007/0030276 A1 * | 2/2007 | MacInnis | ............... | G06T 9/007 345/505 |
| 2007/0109015 A1 * | 5/2007 | Hanes | ............... | H04L 49/10 326/38 |
| 2008/0022396 A1 * | 1/2008 | Kado | ............... | G06F 12/1441 726/19 |
| 2009/0204965 A1 * | 8/2009 | Tanaka | ............... | G06F 9/5077 718/1 |
| 2009/0248935 A1 * | 10/2009 | Ehrlich | ............... | G06F 13/26 710/264 |
| 2010/0241777 A1 * | 9/2010 | Kocherry | ............... | G06F 13/24 710/262 |
| 2012/0050260 A1 * | 3/2012 | Cheng | ............... | G06F 3/1438 345/419 |
| 2013/0077116 A1 * | 3/2013 | Toshima | ............... | G06F 3/1204 358/1.13 |
| 2013/0128120 A1 * | 5/2013 | Chanda | ............... | H04N 5/44504 348/600 |
| 2014/0095932 A1 * | 4/2014 | Mangano | ............... | G06F 11/3648 714/30 |
| 2014/0109182 A1 * | 4/2014 | Smith | ............... | H04L 63/1416 726/3 |
| 2014/0195708 A1 * | 7/2014 | Klein | ............... | G06F 13/24 710/263 |
| 2014/0258577 A1 * | 9/2014 | Egi | ............... | G06F 13/366 710/113 |
| 2015/0356953 A1 * | 12/2015 | Modrzyk | ............... | G09G 5/363 345/531 |
| 2015/0379679 A1 * | 12/2015 | Wang | ............... | G06T 1/20 345/506 |
| 2016/0180117 A1 * | 6/2016 | Doyle | ............... | G01N 27/045 726/26 |
| 2016/0196141 A1 * | 7/2016 | Deshpande | ............... | G06F 13/24 712/244 |
| 2016/0210260 A1 * | 7/2016 | Case | ............... | G06F 9/5011 |
| 2016/0350162 A1 * | 12/2016 | Schlagenhaft | ............... | G06F 11/076 |
| 2017/0140500 A1 * | 5/2017 | Croxford | ............... | G06F 3/1423 |
| 2017/0177338 A1 * | 6/2017 | Gschwind | ............... | G06F 9/30101 |
| 2018/0095677 A1 * | 4/2018 | Chrobak | ............... | G09G 5/001 |

OTHER PUBLICATIONS

Cyril Clocher, "Revolutionize the Automotive Cockpit", Texas Instruments, Inc., SPRY307, Jun. 2017, pp. 1-8.

* cited by examiner

DISPLAY SUB-SYSTEM SHARING FOR HETEROGENEOUS SYSTEMS

FIELD OF THE DISCLOSURE

This disclosure relates a display subsystem that may be shared by different host processors in a multiprocessor system.

BACKGROUND OF THE DISCLOSURE

Complex systems are now being implemented on a single integrated circuit chip and are commonly referred to as a "system on chip" (SoC). An SoC may include one or more processor cores that may act as a host processor(s), one or more coprocessors, one or more hardware accelerators, one or more levels of memory, caches, etc, and a multitude of peripherals and other support circuitry. Some SoCs may include a display subsystem that may be used to format image, graphic, and/or video data for display on one or more display devices. These SoCs may be referred to as "Heterogeneous Systems" because different types of processors, coprocessor, and hardware accelerators may be interconnected within the single integrated circuit.

Automotive infotainment systems provide information to the driver and occupants of a vehicle via visual display devices, speakers, etc. The infotainment systems may also interface with media devices provided by the occupants of the vehicle and allow content from those devices to be reproduced on the vehicle's sound and video system. The infotainment system may also interact with the instrument cluster, human-machine interface (HMI), Telematic Control Unit (TCU), the console/navigation system head unit, etc. Improvements in infotainment systems have been enabled in part by SoCs that implement heterogeneous systems.

Advanced Driver Assistance Systems (ADAS) are one of the fastest-growing application areas in vehicles today. These safety systems have been introduced into automobiles to reduce human operation error. A multitude of features can now warn drivers, allow better visibility into what is going on outside the car, and support features like park assist and adaptive cruise control. The proliferation of ADAS has been enabled in part by improvements in microcontroller and sensor technologies provided by SoCs that implement heterogeneous systems.

SUMMARY OF THE DISCLOSURE

An embodiment of the present disclosure within an integrated circuit may include a display sub-system that has a plurality of image processing resources and control logic. The image processing resources may include a plurality of image processing pipelines configured to operate in parallel, overlay logic coupled to receive image data from the plurality of image processing pipelines, and an image output port coupled to an output of the overlay logic with image data outputs configured to couple to one or more display devices. The control logic may be dynamically configurable to assign each of the image processing resources to a selected one of a first control port and a second control port. The first control port may be configured to be controlled exclusively by a first processor and the second control port may be configured to be controlled exclusively by a second processor.

BRIEF DESCRIPTION OF THE DRAWINGS

Particular embodiments in accordance with the disclosure will now be described, by way of example only, and with reference to the accompanying drawings.

Figure 1:
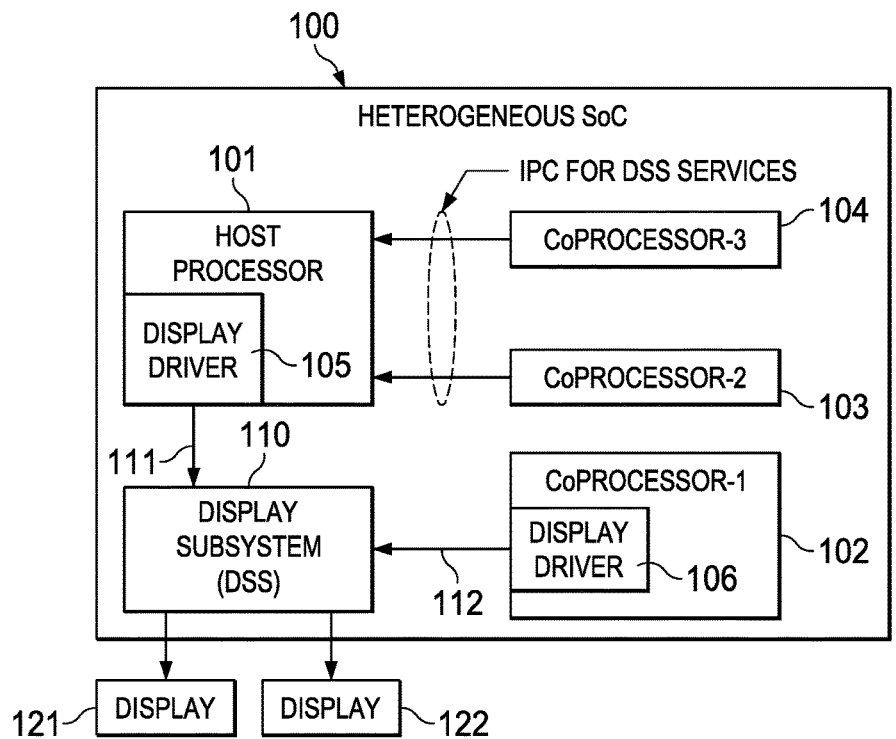
FIG. 1 is a high level block diagram of an example heterogeneous multiprocessor system-on-a-chip (SOC) including a configurable display subsystem (DSS)

Other features of the present embodiments will be apparent from the accompanying drawings and from the detailed description that follows.

DETAILED DESCRIPTION OF EMBODIMENTS OF THE DISCLOSURE

Specific embodiments of the disclosure will now be described in detail with reference to the accompanying figures. Like elements in the various figures are denoted by like reference numerals for consistency. In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Automotive infotainment systems and advanced driver assistance systems typically employ multiple processors and specialized hardware (HW) accelerators to perform the computations required to implement the systems. A typical display sub-system (DSS) used in a multimedia system on a chip (SoC) supports multiple pipelines and multiple overlays. This is required to support blending or composition of multiple contents inside the DSS and also to drive multiple displays simultaneously. The effective utilization of the HW acceleration engines and peripherals to maximize the ability to run concurrent applications, share peripherals among multiple processors, and to design application centric isolated systems is a great challenge in multiprocessor heterogeneous systems. In order to gain the best performance from the heterogeneous systems, the architecture should be flexible and supportive of concurrent applications, while at the same time guaranteeing the performance and isolation.

The display subsystem may be one of the core modules for an application processor system. In the traditional systems, a host processor is given the full control of the display subsystem. All the other cores/processors depend on the host processor for display services. This approach has several limitations, such as: limits the number of concurrent applications using a shared HW block; limits the possibility of having application centric isolated stack design; and creates interdependency across multiple cores inside the heterogeneous system and mandates multiple inter-processor calls (IPC).

For example, a hypervisor or virtual machine monitor (VMM) software model may be used to create and run virtual machines within the ADAS and infotainment systems. Typically, the DSS has been completely controlled by the host processor executing the hypervisor logical domain 0 context. This adds overhead for all the other applications running in non-hypervisor context. Those applications will need to rely on either IPC or processor context switch with additional latency. In this case, software (SW) development effort and productization cost may be high. In addition, a system using this model may not be portable across multiple platforms running multiple operating systems.

In another example, a system may be designed that enforces multiple instances of the display sub-system to achieve application parallelism and isolation. However, this case may not be flexible to allow a generic use case, because DSS resources are statically assigned to a particular processor core. Such an architecture is not efficient with single host systems because the display processing blocks from multiple DSS instances cannot be combined to maximize the degree of composition. Thus, it is not feasible to address most of the automotive use-cases, where the final composition may be rendered from multiple processor cores and targeted for a single head unit display device.

A distributed driver architecture is disclosed herein that allows DSS usage by an application centric processor along with the host processor, for example. Robust partitioning of DSS processing blocks (Pipelines, overlays, interrupts etc) among multiple processors may be provided to allow parallel and independent control of the DSS resources in an interference free environment. Inbuilt and on-the-fly (OTF) hardware checks may be provided to maintain isolation between the different hosts and prevent information leakage.

The distributed driver architecture disclosed herein enables application centric architectures that enable quick and easy application implementation with a dedicated coprocessor. For example, a rear view camera application, a boot animation feature, a surround view system, etc. This architecture brings robustness to the application by allowing independent display subsystem control by the coprocessor that is implementing the new application. An application developed to run on the coprocessor may then be easily ported to another platform under another operating system (OS). This may reduce development cost because the development cycle may be shorter.

Additional dedicated hardware functions may be provided to enable the robust partitioning of the DSS processing blocks. For example, hardware interrupt requests may be duplicated and selectively provided to the separate processors. Separate HW secure bit control may be provided for each of the DSS resources. Memory map partitioning may be provided to allow independent firewalling for each of the DSS resources. Configurable resource partitioning may be provided for a given platform. These dedicated hardware functions will now be described in more detail herein below.

FIG. 1 is a high level block diagram of an example multiprocessor SoC 100 in which a host processor 101 and a coprocessor 102 are both provided independent access to a display subsystem 110. One or more display devices 121, 122 may be coupled to SoC 100 and display images under control of DSS 110.

A display driver 105 may be implemented in software and executed on host processor 101 to control image processing resources in DSS 110 that may be used to form the images displayed on display devices 121 and/or 122, for example. Another display driver 106 may be implemented in software and executed on host coprocessor 102 to control image processing resources in DSS 110 that may be used to form the images displayed on display devices 121 and/or 122, for example. Various image processing resource within DSS 110 may be individually allocated to either host processor 101 or to coprocessor 102 so that the respective display drivers 105, 106 may directly control a set of image processing resource within DSS 110.

In this example, two control ports 111, 112 are provided on DSS 110 to allow two heterogeneous processors, such as host processor 101 and coprocessor 102 to directly access image processing resources within DSS 110. In another embodiment, additional ports may be provided using the same techniques disclosed herein to allow a larger number of heterogeneous processors to directly control image processing resources within a display subsystem such as DSS 110.

In this embodiment, additional heterogeneous processors, such as coprocessor 103 and coprocessor 104 may also be configured to produce image data that may be displayed on display 121 and/or 122. In this case, since there are only two independent control ports 111, 112, coprocessor 103 and coprocessor 104 may be coupled to host processor 101 and thereby send inter-processor calls (IPC) using known or later developed IPC techniques to request access to DSS 110 via display driver 105 on host processor 101.

Texas Instruments Incorporated (TI) offers a family of infotainment processors, referred to as the "Jacinto 6" family (DRA7xx) that may be paired with robust software to provide unprecedented feature-rich, in-vehicle infotainment, instrument cluster and telematics features to next generation automobiles. The "Jacinto 6" family of SoCs integrate industry-leading ARM cores; graphics accelerators; up to six configurable video ports; eight multichannel audio serial ports; and digital signal processor (DSP) core(s) to provide applications such as software-defined radio; speech recognition; audio post-processing; high-definition video and multi high definition (HD) display support. The SoCs also incorporate TI's Vision AccelerationPac including two embedded vision engines (EVEs) that enable simultaneous informational advanced driver assistance systems (ADAS) as well as a mix of peripherals for automotive use cases. An example member of the family is described in more detail in "DRA72x Infotainment Application Processor, SPRS956B, January 2017, which is incorporated by reference herein. In one embodiment, SoC 100 may be similar to a DRA72x SoC to which the enhancements disclosed herein are added.

Figure 2:
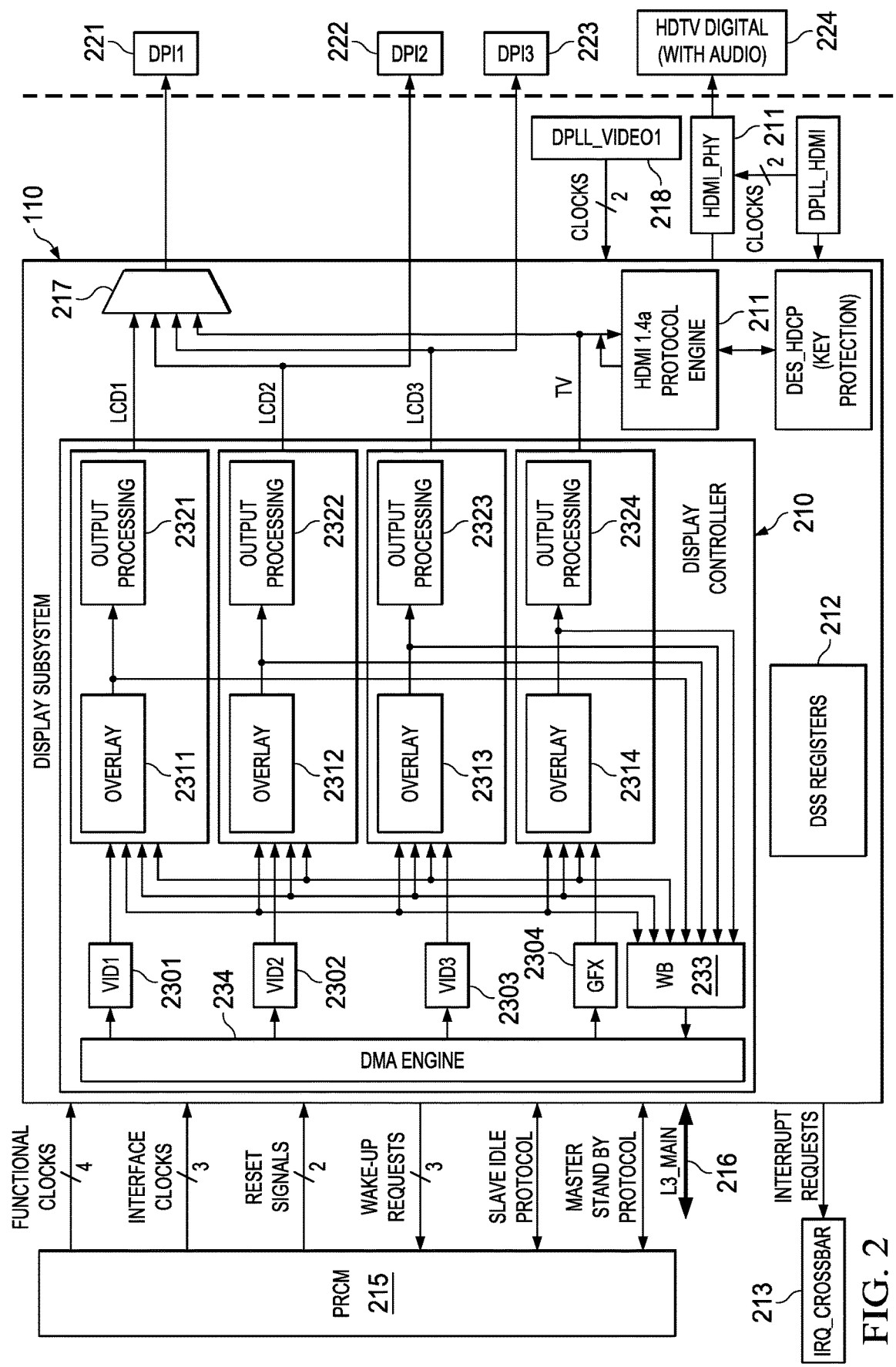
FIG. 2 is a more detailed block diagram of the DSS included in the SoC of FIG. 1.

FIG. 2 is a more detailed block diagram of display subsystem 110 included in SoC 100 of FIG. 1. In this example, DSS 110 includes a display controller 210 that has four image processing pipelines 2301-2304, of which three are video pipelines VID1, VID2, VID3 and one is a graphics pipeline GFX. The image processing pipelines may also be referred to as "image processing resources." In this example, there are four image processing resource that may be allocated to either host processor 101 or coprocessor 102, referring again to FIG. 1. In other embodiments, there may be more or fewer image processing resources. In other embodiments, there may a different mix of graphics and video pipelines, for example.

In this example, there are four overlay modules 2311-2314 and four output processing blocks (VP) 2321-2324. Outputs from the four VP blocks may be routed to one or more display units, such as liquid crystal display (LCD) units. In this example, up to three display units, such as LCD displays 221, 222, 223 may be coupled to outputs from DSS 110 to receive images generated by the processing resources within display controller 210.

In this example, DSS 110 also includes support for an HDMI (high definition multi-media interface) port. Protocol engine 211 generates the required timing signals using clock signals provided by a digital phase locked loop (DPLL) 219. A high definition television (HDTV) monitor 224 may by connected to the HDMI port.

A set of memory mapped registers (MMR) 212 may be provided to hold various parameters and data that may be used to control the operation of the various processing resources included within DSS 110.

Figure 3B:
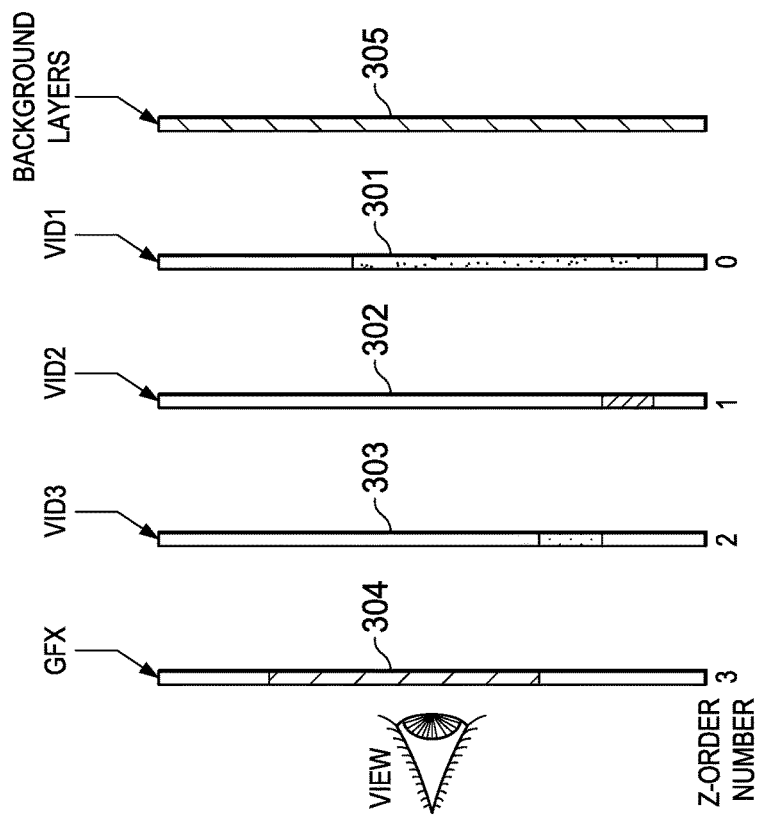
FIGS. 3A, 3B together illustrate an example of overlaid images for a display device connected to the DSS of FIG. 2.
Figure 3A:
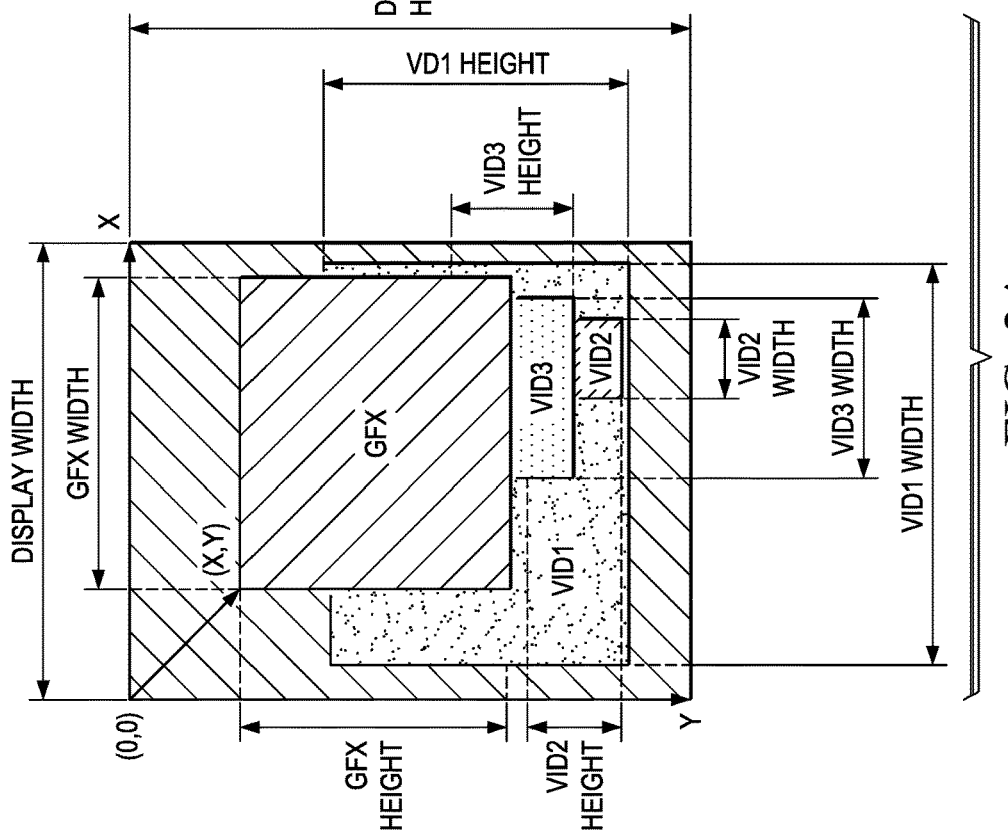

FIG. 3A illustrates an example of overlaid images for a display device connected to one of the output ports of DSS 110. FIG. 3B illustrates a "side view" of the background 305 and four image plans 301-304 provided by the four processing resources VID1, VID2, VID3, and GFX. Note that each of the four overlay resources 2311-2314 is configurable to receive image data from each of the four image processing resources 2301-2304. MMR 212 may be programmed to control various parameters for each of the four image processing resources, such as: image height and width, format, base address, row increment, pixel increment, transparency color key, rotation, type of image (STN/TFT, mono/color), depth, background color, timing, etc.

Referring back to FIG. 2, a direct memory access (DMA) engine 234 may be included within DSS 110 that may be programmed to transfer graphic, image, and video data from a memory subsystem that is coupled to a level three (L3) memory bus 216. Image and video data may be captured by cameras that are located in a vehicle that includes SoC 100, for example. The cameras may be interfaced to SoC through input ports that are included with SoC 100, for example.

A write back (WB) function is provided that allows the output from any of the four processing resources or the output from any of the four overlay modules 2311-2314 to be selected and written back to system memory via the L3 main memory bus 216.

A power, reset, and clock module (PRCM) 215 provides power, reset signals, and clock signals to DSS 110. DPLL 218 generates a set of clock signals that may be used by PRCM 215.

The general operation and implementation of video and graphics pipelines, overlay blocks, output processing block, and DMA engine are described in more detail in SPRUIC2 and need not be described in further detail herein.

Figure 4:
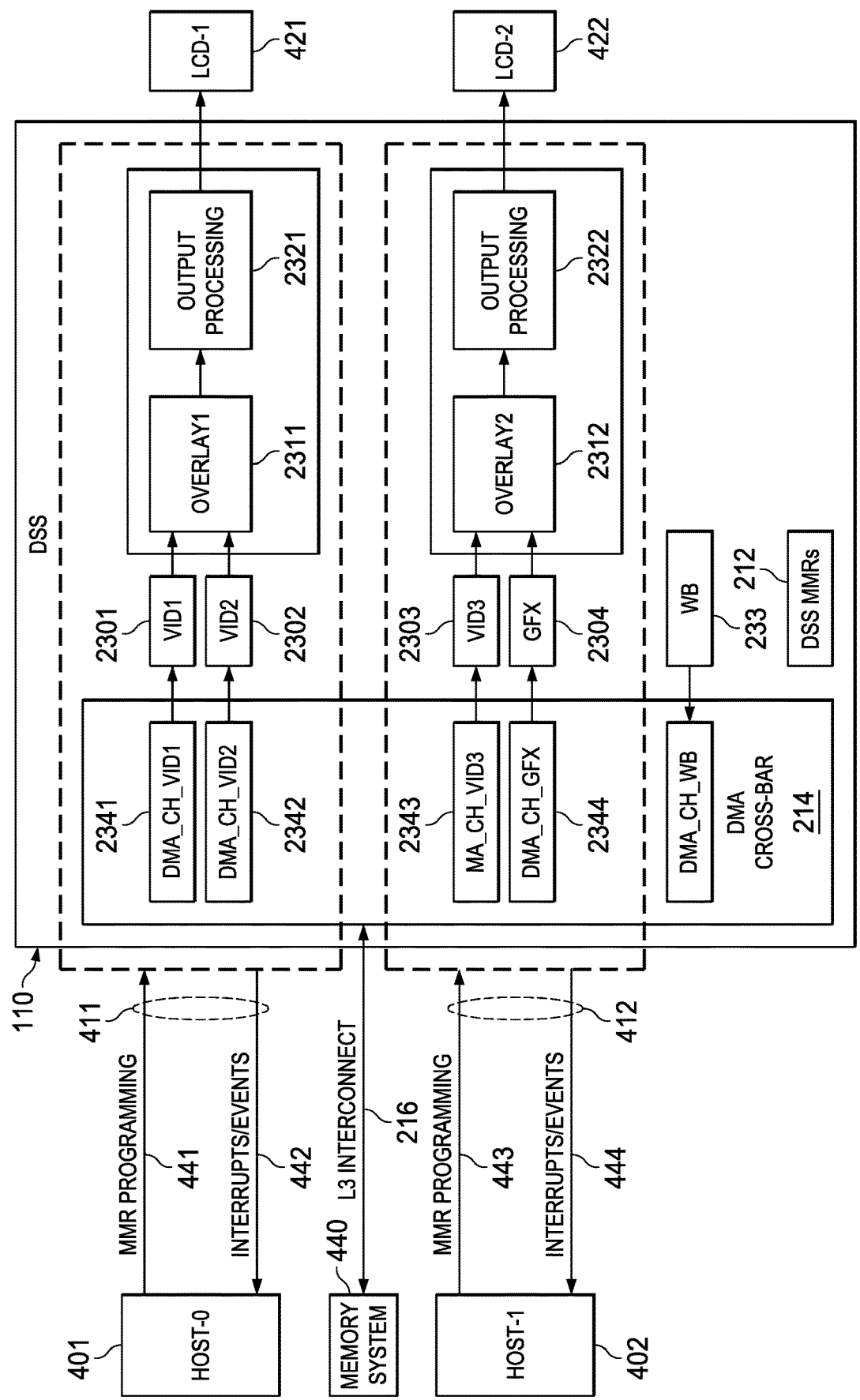
FIGS. 4 and 5 are more detailed block diagrams of the DSS of FIG. 2 illustrating examples of different configurations.
Figure 5:
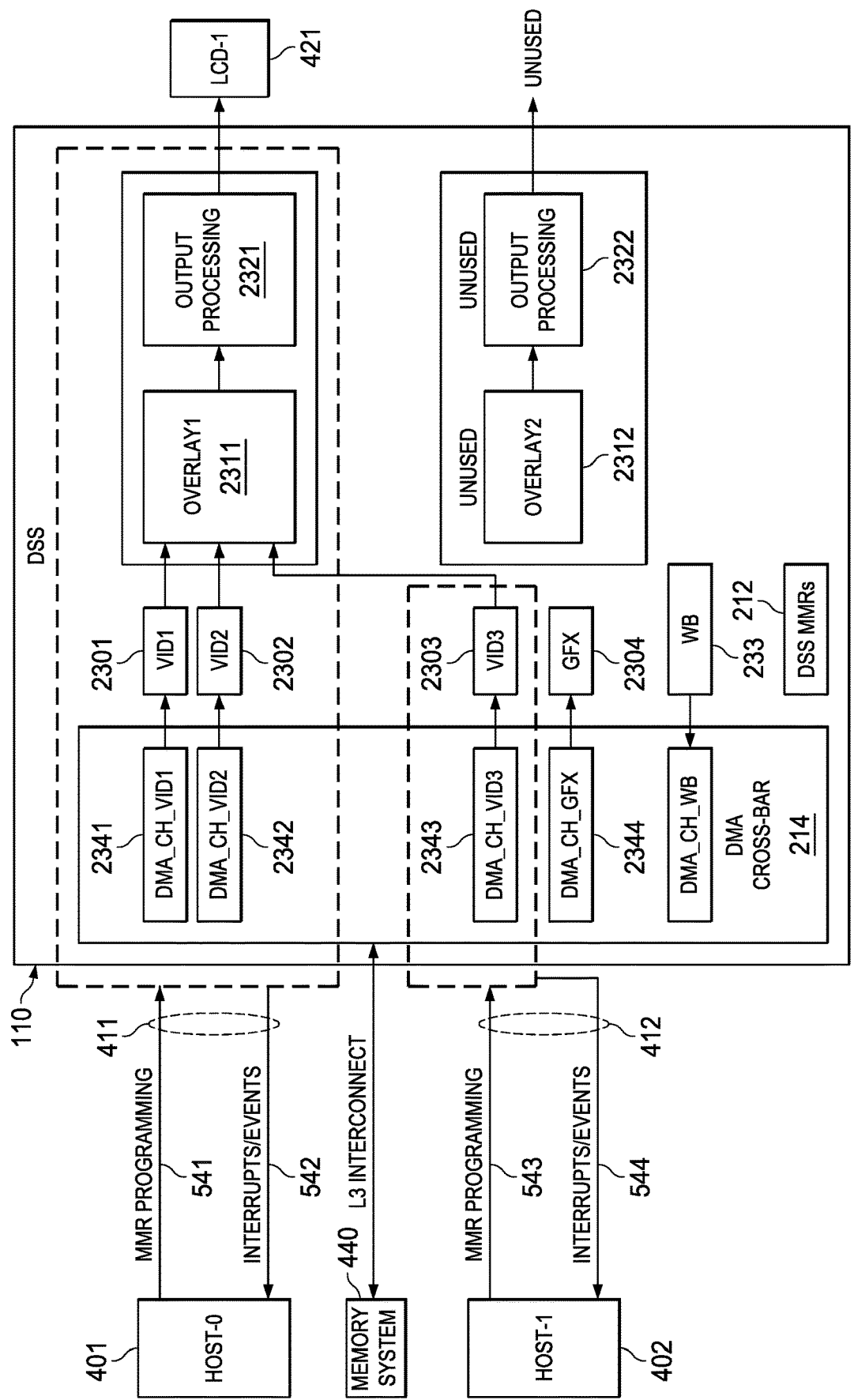

FIGS. 4 and 5 are more detailed block diagrams of DSS 110 illustrating examples of different functional configurations that may be configured in a dynamic manner during operation of DSS 110. In the example system configuration of FIG. 1, one of the two processors 101, 102 may become the DSS Primary Owner, and other processor may become the DSS Secondary Owner. The primary owner may be responsible for initializing the display subsystem 110 to configure various resources, such as: PLL clocks, DSS common registers, overlay manager registers, panel drivers, etc. in order to bring display subsystem 110 into an operating state that is ready to use.

The primary owner, such as processor 101, may be allocated only a subset of the DSS resources required to realize time and safety critical applications, for example. The secondary owner, such as coprocessor 102, relies on the primary owner processor 101 for common register configuration. Secondary owner coprocessor 102 may be allocated the remaining DSS resources that may be used perform another set of the applications.

DSS 110 resource partitioning is configurable for a given platform. For example, since there are four image processing pipelines 2301-2304, various combinations of image processing resources may be allocated to primary owner and secondary owner at different times, depending on what applications are being executed by SoC 100, referring again to FIG. 1. For example, at one time three image processing resources may be allocated to the primary owner and one image processing resource may be allocated to the secondary owner. At another time, only one image processing resource may be allocated to the primary owner and three image processing resources may be allocated to the secondary owner. At yet another time, all four image processing resource may be allocated the primary owner or to the secondary owner.

FIG. 4 illustrates an example in which two image processing pipelines 2301, 2302, one overlay resource 2311, one output processing resource 2321, and two DMA channels 2341, 2342 are allocated to host-0 401, which may be host 101 or coprocessor 102, referring again to FIG. 1. The image processing pipelines may be processing different image content, such as graphical user interface (GUI) info, video info, an image stream captured by a camera mounted on the vehicle and coupled to the SoC, etc. In this example, output processing resource 2321 is configured to provide image data to display device 421, which may be an LCD display device, for example.

At the same time, two image processing pipelines 2303, 2304, one overlay resource 2312, one output processing resource 2322, and two DMA channels 2343, 2344 are allocated to host-1 402, which may be coprocessor 102 or host 101, referring again to FIG. 1. In this example, output processing resource 2322 is configured to provide image data to display device 422, which may be an LCD display device, for example.

In this example, all hardware interrupts 442 generated by the various resources allocated to host-0 401 are configured to be provided directly to host-0 401. Similarly, hardware interrupts 444 generated by the various resources allocated to host-1 402 are configured to be provided directly to host-1 402. In this manner, each host can respond immediately to interrupts produced by resources assigned to the respective host, without incurring time delays for interprocessor calls or other multilevel signaling protocols.

In this example, the portion of MMRs 212 that control the resource allocated to host-0 401 may be directly programmed as indicated at 441 by host-0 401 by performing memory transactions to the range of memory addresses assigned to that portion of memory mapper registers 212. Similarly, the portion of MMRs 212 that control the resource allocated to host-1 402 may be directly programmed as indicated at 443 by host-1 402 by performing memory transactions to the range of memory addresses assigned to that portion of MMRs 212.

Graphic data, video data, and image data may be moved from memory subsystem 440, or other memory blocks within SoC 100 or external blocks of memory coupled to SoC 100 by DMA channels 2341-2344 under direct control of the host to which the DMA channels are allocated.

In this example, control port 411 which is representative of control port 111 on FIG. 1 includes access to MMR programming resources 441 and hardware interrupts 442. Similarly, control port 412 which is representative of control port 112 on FIG. 1 includes access to MMR programming resources 443 and hardware interrupts 444.

FIG. 5 illustrates an example in which two image processing pipelines 2301, 2302, one overlay resource 2311, one output processing resource 2321, and two DMA channels 2341, 2342 are allocated to host-0 401, which may be host 101 or coprocessor 102, referring again to FIG. 1. In this example, output processing resource 2321 is configured to provide image data to display device 421, which may be an LCD display device, for example.

At the same time, only one image processing pipeline 2303 and one DMA channel 2343 are allocated to host-1 402, which may be coprocessor 102 or host 101, referring again to FIG. 1. In this example, image processing resource 2303 is configured to provide image data to overlay resource 2311 and thereby to LCD display 421.

In this example, all hardware interrupts 542 generated by the various resources allocated to host-0 401 are configured to be provided directly to host-0 401. Similarly, hardware interrupts 544 generated by the various resources allocated to host-1 402 are configured to be provided directly to host-1 402. In this manner, each host can respond immediately to interrupts produced by resources assigned to the respective host, without incurring time delays for interprocessor calls or other multilevel signaling protocols.

In this example, the portion of MMRs 212 that control the resource allocated to host-0 401 may be directly programmed as indicated at 541 by host-0 401 by performing memory transactions to the range of memory addresses assigned to that portion of MMR 212. Similarly, the portion of MMRs 212 that control the resource allocated to host-1 402 may be directly programmed as indicated at 543 by host-1 402 by performing memory transactions to the range of memory addresses assigned to that portion of MMR 212.

Graphic data, video data, and image data may be moved from memory subsystem 440, or other memory blocks within SoC 100 or external blocks of memory coupled to SoC 100 by DMA channels 2341-2343 under direct control of the host to which the DMA channels are allocated.

As can be seen by these examples, the various resources such as image processing pipelines, overlay blocks, output processing modules, DMA channels, writeback channels, etc. may be dynamically allocated to either host-0 401 or host-1 402 as needed at any given time to accommodate different applications that may be executed on SoC 100.

Each of the image output ports are configurable to have independent resolution, refresh rate and timing parameters that may be configured by appropriate setting of control registers. Each image processing resource is configurable to be synchronized to the resolution, refresh rate and timing parameters of either the first image output port or the second image output port.

Figure 6:
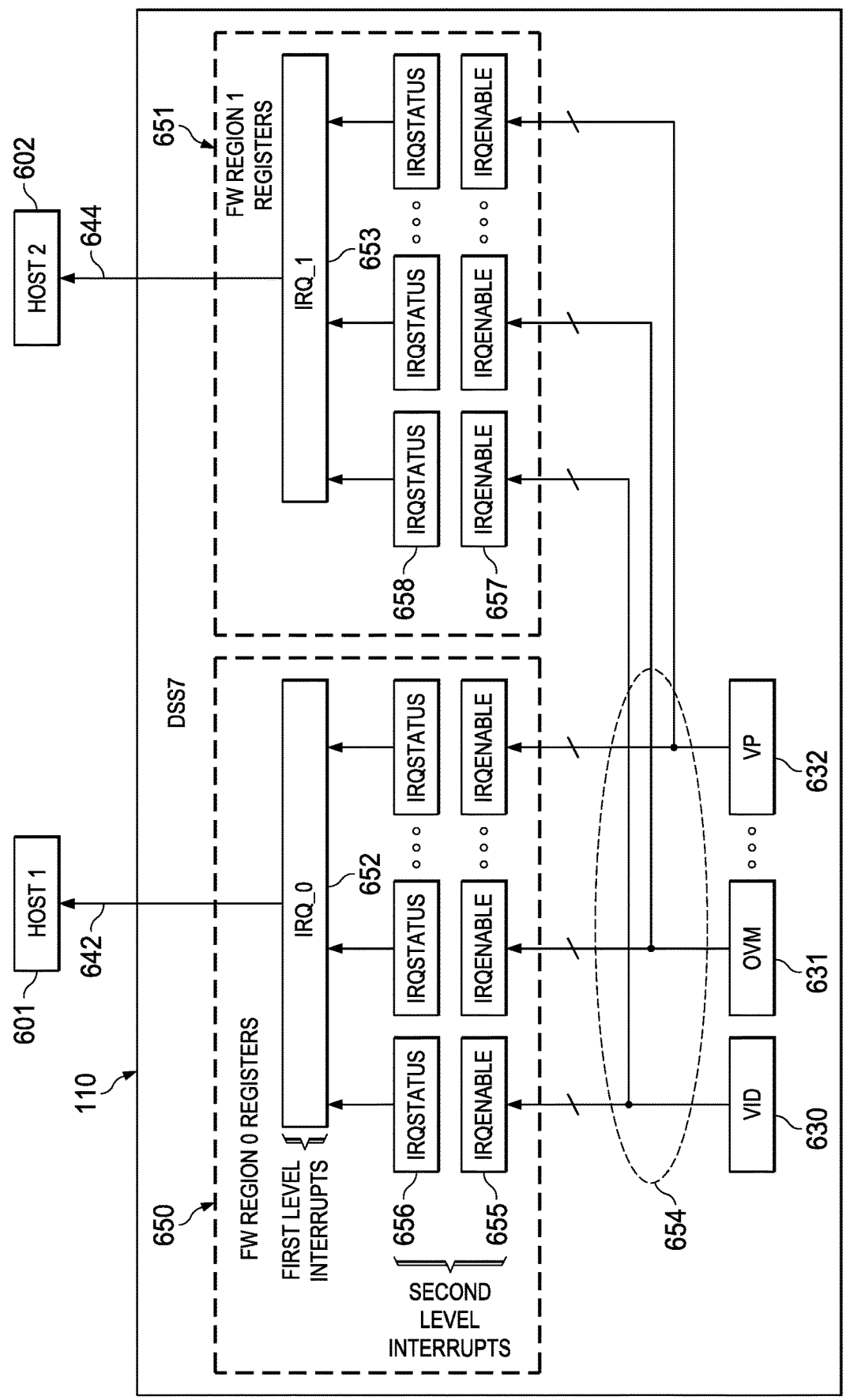
FIG. 6 is a more detailed block diagram of the interrupt request logic contained in the DSS of FIG. 2.

FIG. 6 is a more detailed block diagram of the interrupt request logic contained in DSS 110. In this example, two sets 650, 651 of interrupt (IRQ) aggregation registers and IRQ generators may be provided to enable fully independent monitoring and control of the interrupt events by two separate hosts. In this example, host 1 601 may represent host 101 in SoC 100 as illustrated in FIG. 1, for example. Similarly, host 2 602 may represent coprocessor 102 in SoC 100 as illustrated in FIG. 1. In another embodiment, three or more sets of interrupt aggregation registers and IRQ generators may be provided to enable fully independent monitoring and control of the interrupt events by three or more separate hosts. Such isolation allows a particular host to see only those interrupts which it is interested in rather than seeing all the interrupts generated by all of the resources within DSS 110.

In this example, a set of resources 630, 631, 632, etc may each assert an interrupt request signal to indicate that it has completed an operation, encountered an error, etc. These resources may correspond to the image processing pipelines, overlay modules, output processing modules, DMA channels, writeback channels, etc that were described in more detail with regards to FIG. 2, for example. For example, VID resources 630 may represent the four image processing pipelines 2301-2304 illustrated in FIG. 2. In other embodiments, VID resources 630 may represent more or fewer image processing resources. Each resource may be configured to initiate interrupt requests on one or more IRQ signal lines. For example, each image processing pipeline 2301-2304 may assert an interrupt request for each of buffer underflow, end of window, security violation, etc. Thus, in this example, four or more interrupt request signals may be initiated by the four VID resources 630. OVM resource 631 may represent the four overlay modules 2311-2314 illustrated in FIG. 2 that may each generate one or more interrupt requests. VP resource 632 may represent the four output processing modules 2321-2324 illustrated in FIG. 2 that may each generate one or more interrupt requests.

Signal lines 654 represent all of the various IRQ signal lines that may be originated by the various resources within DSS 110. These IRQ signal lines are provided as inputs to each set of interrupt aggregation registers 650, 651. In this embodiment, an IRQ occurs in the form of a pulse generated by the requesting resource.

Interrupt aggregation registers 650 may include IRQ enable registers 655 and IRQ status registers 656 that form a second level of IRQ circuitry. As discussed above, a given set of resources, such as VID 630, may produce more than one IRQ signal that may be captured as different bits in IRQ status register 656. In that case, aggregation logic included with IRQ status register 656 may aggregate ("OR") the IRQ bits to form one single IRQ signal that is forwarded to first level IRQ status register 652. Similarly, aggregation logic included with IRQ status register 652 may aggregate ("OR") the IRQ bits received from the various IRQ status registers 656 to form one single IRQ signal 642 that is forwarded to host 1.

Similarly, interrupt aggregation registers 651 may include IRQ enable registers 657 and IRQ status registers 658. Aggregation logic included with IRQ status register 658 may aggregate ("OR") the IRG bits to form one single IRQ signal that is forwarded to first level IRQ status register 653. Similarly, aggregation logic included with IRQ status register 653 may aggregate ("OR") the IRG bits received from the various IRQ status registers 658 to form one single IRQ signal 644 that is forwarded to host 2.

When a particular IRQ signal is pulsed, then a corresponding bit in IRQ status register 656 will be set when that particular IRQ signal is enabled by enable register 655 and a corresponding bit in IRQ status register 658 will be set when that particular IRQ signal is enabled by enable register 657. Thus, when a particular IRQ signal is pulsed, a corresponding IRQ bit may be set in either or both IRQ status registers 656, 658. This allows either host 1 or host 2 to be interrupted.

In this example, IRQ status register 651 provides a single IRQ signal 642 to host 1, and IRQ status register 653 provides a single IRQ signal 644 to host 2. This configuration allows DSS 110 to be configured so that host 1, for example, may receive an IRQ signal from a DSS resource, such as VID1 2301, referring to FIG. 2, while host 2 does not receive that IRQ signal.

At a different time, DSS 110 may be configured so that both host 1 and host 2 receive an IRQ signal from a same DSS resource, such as VID1, for example. In this case, one of the hosts, such as host 1 for example, could respond to the interrupt request and reset the IRQ bit in second level IRQ register 656, while leaving the IRQ for the same event still active in second level IRQ register 658 and thereby maintaining an IRQ signal to host 2.

Thus, DSS 110 may be dynamically configured to allow interrupts from each of various resources within DSS 110 to be received and responded to by either host 1 or host 2 or both host 1 and host 2. This allows resources within DSS 110 to be allocated to and directly managed by either host 1 or host 2.

Referring again to FIG. 2, DSS 110 may also include an interrupt request cross bar circuit 213. Cross bar circuits are well known and provide some flexibility in routing IRQ signals from various requestors in DSS 110 to various responders in DSS 110. In this embodiment, IRQ signals 642 and 642 may be routed to a particular processor or coprocessor within DSS 110. A crossbar is typically implemented as a multiplexor that is configured to route one of multiple inputs from the various requestors to an output that connected to an IRQ input on a particular responder. Multiple multiplexors may be implemented to connect to the various IRQ inputs on the various responders within DSS 110. However, crossbar 213 does not provide the flexibility of configuring, allocating, and masking of IRQ signals that is provided by aggregation logic 650, 651.

Figure 7:
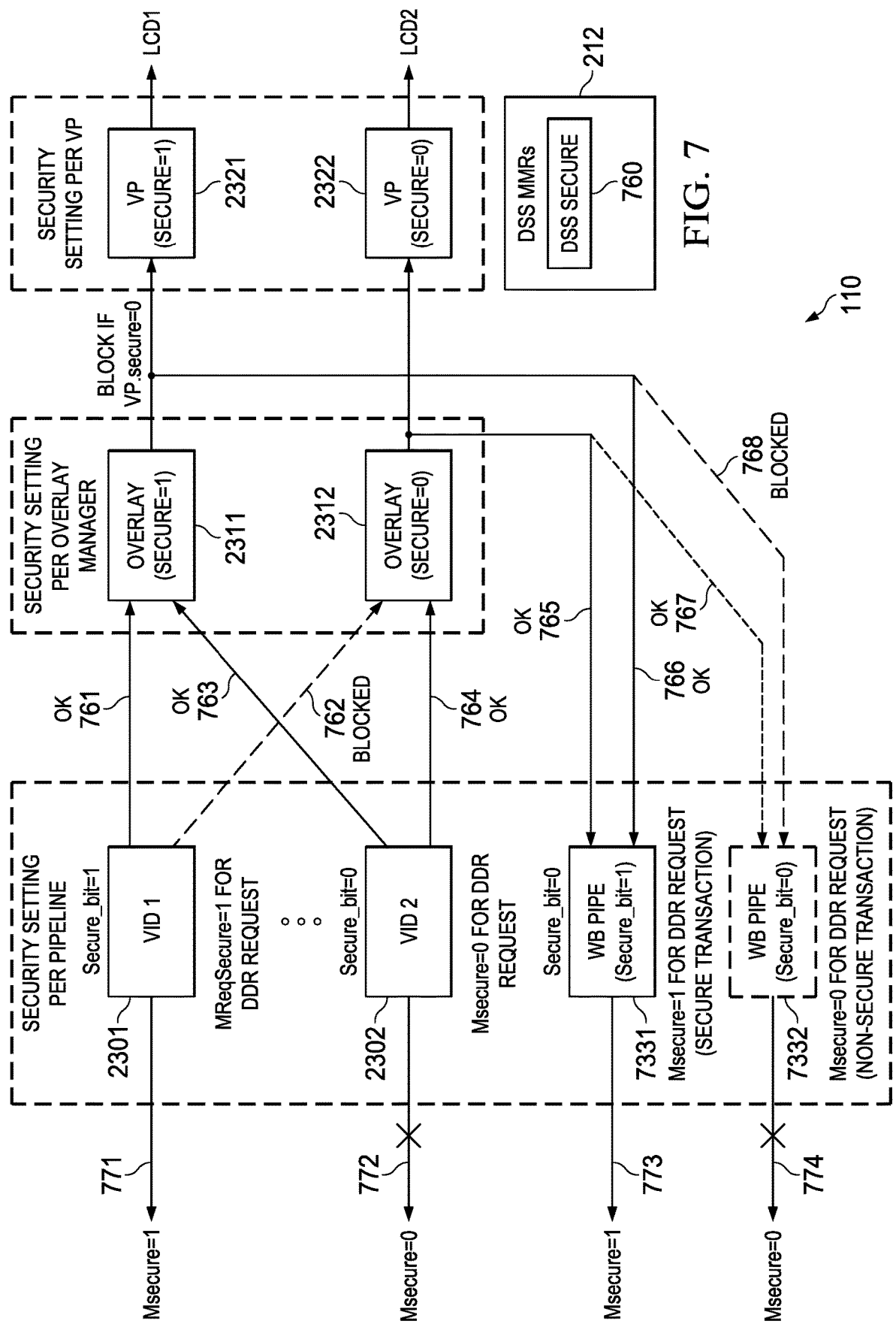
FIG. 7 is a functional illustration of example security features that may be included in the DSS of FIG. 2.

FIG. 7 is a functional illustration of example security features that may be included in DSS 110. Separate security settings may be configured for each resource within DSS 110. Built in hardware (HW) checks may be configured to prevent non-secure resources from accessing content from secure resource, thereby preventing a data leak. This provides an added level of isolation across the different hosts over and above the system firewalls. In this example embodiment, DSS 110 supports a secure mode configuration and an Illegal connection prevention mode.

One or more of the registers included in the DSS memory mapped control registers 212 is a secure mode configuration register (DSS_SECURE) 760 which defines the "secure" mode attribute of each pipeline, Overlay Manager, and VP module in DSS 110. This register can only be modified by a host with an appropriate secure privilege setting. In this example, a security register associated with a host requesting a memory transaction with the DSS must have a "memory request secure" bit set to "1" (MReqSecure=1). When the secure bit corresponding to a DSS resource is set by a secure host, the resource is deemed to be in Secure Mode and the DSS 110 hardware prevents the output of the resource from getting connected to a non-secure downstream module. Also, any DMA transfer initiated by a secure pipeline will have its open core protocol (OCP) in-band signal MReqSecure set to HIGH to indicate that it is a secure mode transaction request. By default, all pipelines, Overlay Managers, and VP resources are in non-Secure mode. While the OCP bus standard is used in this embodiment, other embodiments may use other types of bus protocol that may include a provision for secure transfers.

In this example embodiment, DSS 110 HW enforces several rules to prevent an illegal connection. Rule 1: a secure input pipeline can only connect to a secure overlay resource. If a host is trying to connect a secure input pipeline to a non-secure overlay resource, the DSS HW will block the connection and issue a "security violation" interrupt to alert the host. Rule 2: a non-secure WB pipeline can take its input only from a non-secure input pipeline or a non-secure overlay resource output. Otherwise, the DSS HW will block the data transfer through WB and issue a "security violation" interrupt to alert the host. Rule 3: non-secure VP can only display data from a non-secure overlay resource output. Otherwise, the DSS HW will block the data display on the VP and issue a "security violation" interrupt to alert the host.

Thus, an overlay resource path selection is allowed only if the security condition is met. Otherwise, a requested connection is not allowed and a security violation IRQ is generated. Typically, security settings of the VP resources should be set to match the security setting of its associated overlay resource. However, in some cases a secure overlay resource may be configured to connect to a secure write back module but not to a VP, which may be left non-secure.

For example, referring to FIG. 7, assume video pipeline 2301 is configured to be in secure mode by setting its security bit in security register 760 to "1," video pipeline 2302 is configured to be in non-secure mode by setting its security bit in security register 760 to "0," overlay resource 2311 is configured to be in secure mode by setting its security bit in security register 760 to "1," and overlay resource 2312 is configured to be non-secure according to its security bit in security register 760. If an attempt is made to connect an input of non-secure overlay resource 2312 to secure pipeline 2301 as indicated at 762, a security violation interrupt request will be initiated. If an attempt is made to connect an input of non-secure overlay resource 2312 to non-secure pipeline 2302 as indicated at 764, a security violation interrupt request will not be initiated. Similarly, if secure overlay resource 2311 is connected to either secure pipeline 2301 as shown at 761 or non-secure pipeline 2302 as shown at 764, no security violation occurs.

Likewise, if write-back module 233 as shown in FIG. 2 is in secure mode, as illustrated at 7331, then it can be connected to either secure overlay resource 2311 or non-secure overlay resource 2312 without error as indicated at 765 and 766. However, if write-back module 233 is in non-secure mode, as illustrated at 7332, then a security error will occur if it is connected to secure overlay resource 2311 as shown at 768, but no security error will occur if non-secure WB module 233 is connected to non-secure overlay resource 2312 as indicated at 767

A memory access secure (Msecure) bit of DSS_SECURE register 760 is set/reset by a secure transaction. This bit allows DSS to access a system memory or a section of system memory which is designated as secure (secure system memory or secure Frame Buffer). When the Msecure bit has been set, the software (S/W) in Secure-Mode is responsible for checking the display controller configuration. The Msecure bit is propagated by the display controller to the L3-Based Interconnect 216 as shown in FIG. 2 in order to qualify all the display controller requests as secure or non-secure requests based on the Msecure bit defined in the control register. For example, when the Msecure bit=1, read or write accesses between secure system memory 440 as shown in FIG. 4 are allowed as indicated at 771, but when Msecure bit=0, read or write accesses between secure system memory 440 are not allowed as indicated at 772. Similarly, when the Msecure bit=1, write accesses to secure system memory 440 from write back module 233 are allowed as indicated at 773, but when Msecure bit=0, write accesses to secure system memory 440 are not allowed as indicated at 774.

When the DSS 110 accesses the Frame Buffer in SoC 100, in the case the DSS secure bit has been reset and the Frame Buffer has been set secure, the DSS receives an error in response to the non-secure requests. An interrupt is generated to indicate the error received from the L3 Interconnect.

Figure 8:
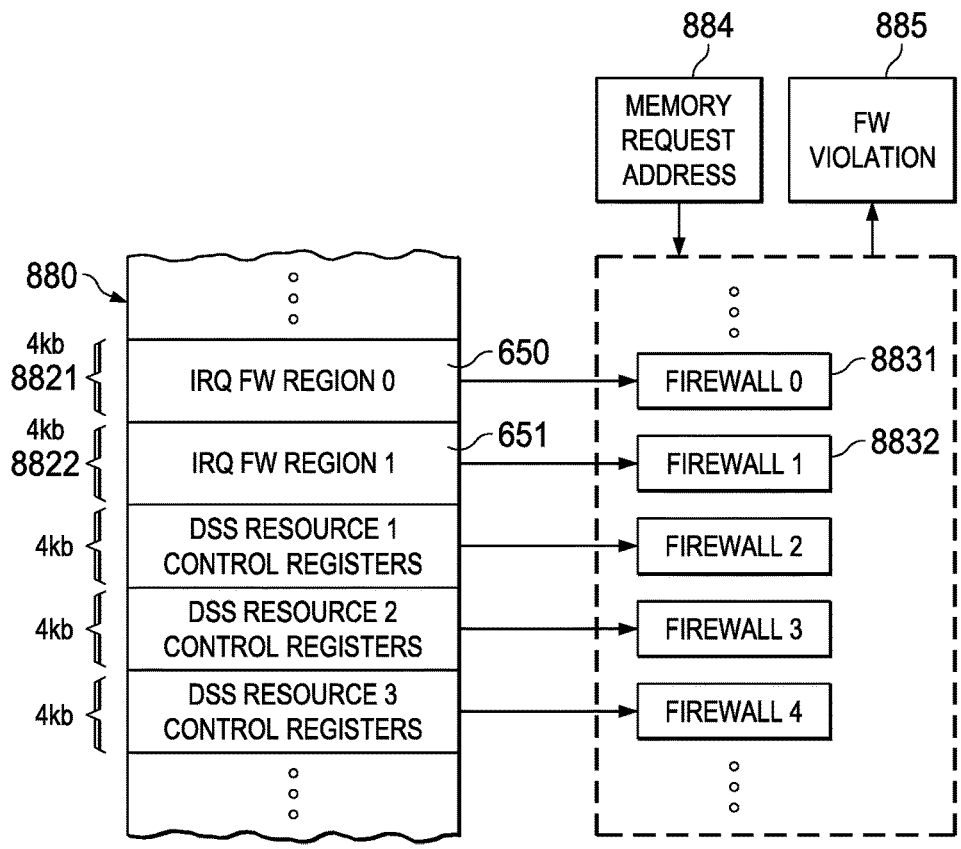
FIG. 8 is a block diagram illustrating firewall logic that may be included in the DSS of FIG. 2.

FIG. 8 is a block diagram illustrating firewall logic that may be included in DSS 110. A portion of the global address space for SoC 100 is represented by address space region 880. In this example, separate 4 KB memory space regions, such as indicated at 8821, 8822, may be allocated for the MMRs corresponding to each resource inside DSS 110. These MMRs are also illustrated as DSS registers 212 in FIGS. 2 and 4. This allows any region to be controlled and manipulated uniquely by a particular host with the help of system level firewalls.

A portion of the system firewall logic is illustrated at 881. A separate firewall may be provided for each 4 KB MMR region, as indicated at 8831, 8832. For example, IRQ aggregation registers 650 as illustrated in more detail in FIG. 6 may be located in MMR region 8821 and protected by firewall logic 8831. IRQ aggregation registers 651 as illustrated in more detail in FIG. 6 may be located in MMR region 8822 and protected by firewall logic 8832. Similarly, MMRs for other DSS resources may be located in different 4 KB address regions and protected by dedicated firewall logic.

Each firewall logic block, such as 8831, 8832, etc, looks at each memory address 884 that is presented for each memory transaction. The firewall looks at the requestor's address, the requestor's ID and privileges (who is requesting) and then decides to allow or reject a transaction. A firewall violation 885 may initiate an interrupt and may block the requested memory transaction.

Each firewall logic block, such as block 8831, may include a comparator to compare the proffered memory transaction address and attributes with designated address range and stored attributes for the associated set of control registers. As disclosed above with regards to FIG. 7, the attributes may include security settings for a given resource.

While a separate 4 KB space is allocated for each MMR region in this embodiment, other embodiments may allocate larger or smaller separate control spaces that may be individually protected by firewalls as described herein.

Figure 9:
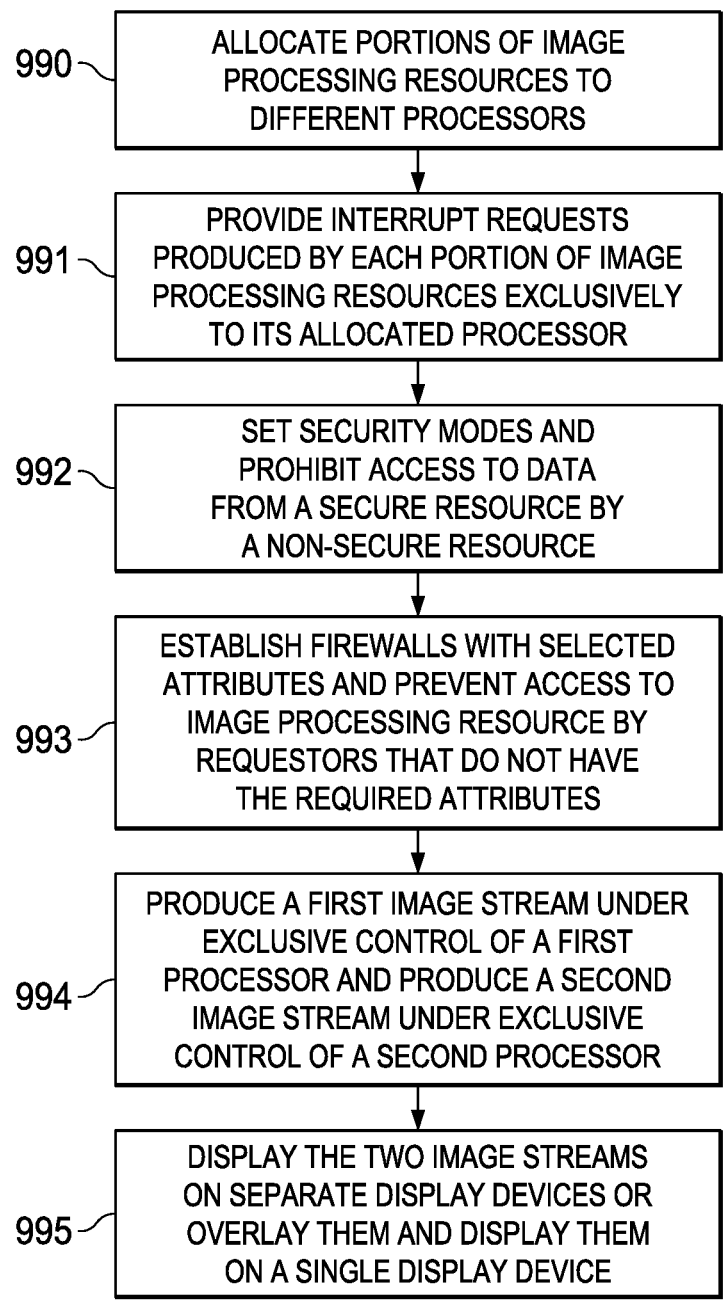
FIG. 9 is a flow chart illustrating operation of the DSS of FIG. 2.

FIG. 9 is a flow chart illustrating operation of a display subsystem that may be embedded within an SoC, such as DSS 110 which is embedded in SoC 100 and which has been described in more detail above. A distributed driver architecture as disclosed herein allows DSS usage by an application centric processor along with the host processor. Robust partitioning of DSS processing blocks (Pipelines, overlays, interrupts etc) among multiple processors may be provided to allow parallel and independent control of the DSS resources in an interference free environment. Inbuilt and on-the-fly (OTF) hardware checks may be provided to maintain isolation between the different hosts and prevent information leakage.

When an SoC, such as SoC 100 shown in FIG. 1, is powered up, image processing resources within an embedded display subsystem, such as DSS 110 shown in FIG. 1, may be allocated to one or more processors within the SoC as indicated in box 990. For example, a first portion of the image processing resources in the display subsystem may be allocated to a first processor, such as host processor 101 shown in FIG. 1. A second portion of the image processing resources in the display subsystem may be allocated to a second processor, such as coprocessor 102 shown in FIG. 1. As described in more detail above, image processing resources within the display subsystem may be re-allocated to the various processors at a later time in a dynamic manner such that image processing and displaying continues uninterrupted.

Two or more control ports for the display subsystem may be implemented within a given SoC by segregating interrupt requests generated by the various image processing resources so the only the processor to which a given image processing resource has been allocated will receive interrupt requests generated by that image processing resource, as indicated in box 991. For example, interrupt requests (IRQ) generated by the first portion of image processing resources may be provided exclusively to the first processor and interrupt requests generated by the second portion of image processing resources may be provided exclusively to the second processor. This may be done by masking IRQs for resources not allocated to a particular processor, as described in more detail with regard to FIG. 6.

Separate security settings may be configured for each resource within a display subsystem, as indicated in box 992. Built in hardware checks may be configured to prevent non-secure resources from accessing content from secure resource, thereby preventing a data leak, as described in more detail with regard to FIG. 7. This provides an added level of isolation across the different hosts over and above the system firewalls. For example, a security mode for a portion of the image processing resources may be set to secure mode while a security mode for another portion of the image processing resources may be set to unsecure mode. Movement of image data from an image processing resource in secure mode to an image processing resource in unsecure mode may thus be prohibited.

A plurality of firewalls may be established as indicated in box 993 with selected attributes associated with different portions of the image processing resources, such that access to a particular portion of the image processing resources is restricted a requester with the selected attributes of the particular portion of the image processing resources. An example of multiple firewalls is described in more detail with regard to FIG. 8.

By making use of the individual control ports and other security features disclosed herein, a first stream of image output data may be produced under exclusive control of the first processor, while a second stream of image output data may be produced under exclusive control of the second processor as indicated at box 994.

The first stream of image output data may be displayed on a first display device coupled to the integrated circuit, while the second stream of image output data may be displayed on a second display device coupled to the integrated circuit as indicated in box 995.

As described above in more detail, image processing resources may be statically or dynamically allocated such that the first stream of image data may be displayed on the second display device and vice versa, or both streams of image data may be overlaid and displayed on a single display device.

Thus, a distributed driver architecture is disclosed herein that allows DSS usage by an application centric processor along with the host processor, for example. Robust partitioning of DSS processing blocks (Pipelines, overlays, interrupts etc) among multiple processors may be provided to allow parallel and independent control of the DSS resources in an interference free environment. Inbuilt and on-the-fly (OTF) hardware checks may be provided to maintain isolation between the different hosts and prevent information leakage.

Other Embodiments

While the disclosure has been described with reference to illustrative embodiments, this description is not intended to be construed in a limiting sense. Various other embodiments of the disclosure will be apparent to persons skilled in the art upon reference to this description. For example, while two control ports and two streams of image data have been discussed herein, in other embodiments three or more control ports for exclusive use by three or more processors to produce three or more streams of image data may be implemented according to the techniques disclosed herein.

While a host processor 101 and a coprocessor 102 are illustrated in FIG. 1, other embodiments may implement multiple heterogeneous or similar host processors, multiple coprocessors, or other combinations. Various types of processors, such as: conventional microprocessors, reduced instruction set cores (RISC), specialty processors, hardware accelerators, etc may be coupled to a dedicated control port in a display subsystem using the techniques disclosed herein.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium such as compact disc (CD), a diskette, a tape, a file, memory, or any other computer readable storage device and then loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the disclosure should not be considered limited to the specific ordering of steps shown in the figures and/or described herein.

It is therefore contemplated that the appended claims will cover any such modifications of the embodiments as fall within the true scope and spirit of the disclosure.

What is claimed is:

1. An integrated circuit comprising:
a first control port;
a second control port;
an output port adapted to be coupled to a display device;
a first image processing resources, the first image processing resources comprising:
   a first set of image processing pipelines configured to operate in parallel; and
   a first overlay logic coupled to the first set of image processing pipelines and the output port, the first overlay logic is configured to:
      receive a first set of respective image data from each of the first set of image processing pipelines; and
      output an overlay of the first set of respective image data to the output port;
a second image processing resource, the second image processing resource comprising:
   a second set of image processing pipelines configured to operate in parallel; and
   a second overlay logic coupled to the second set of image processing pipelines and the output port, the second overlay logic is configured to:
      receive a second set of respective image data from each of the second set of image processing pipelines; and
      output an overlay of the second set of respective image data to the output port;
a first interrupt request (IRQ) aggregation logic configured to:
   receive a first IRQ signal from a first image processing pipeline in the first set of image processing pipelines and a second IRQ signal from a second image processing pipeline in the first set of image processing pipelines;
   mask the first IRQ signal;
   aggregate the masked first IRQ signal and the second IRQ signal into an aggregated first set of IRQ signals; and
   communicate the aggregated first set of IRQ signals to the first control port; and
a second IRQ aggregation logic configured to:
   receive a third IRQ signal from a first image processing pipeline in the second set of image processing pipelines and a fourth IRQ signal from a second image processing pipeline in the first set of image processing pipelines;
   aggregate the third and fourth IRQ signals into an aggregated second set of IRQ signals; and
   communicate the masked aggregated second set of IRQ signals to the second control port.

2. The integrated circuit of claim 1, further comprising control logic that is coupled to the first and second image processing resources, wherein the control logic is configured to:
   assign the first image processing resource and the first IRQ aggregation logic to the first control port; and
   assign the second image processing resource and the second IRQ aggregation logic to the second control port.

3. The integrated circuit of claim 1, further including security logic associated with the first image processing resource, such that a non-secure image processing resource is prohibited from accessing the first image processing resource.

4. The integrated circuit of claim 3, wherein the security logic is operable to alert a secure host coupled to the display system in response to an access attempt to the first image processing resource by a non-secure host.

5. The integrated circuit of claim 1, further including:
a first image output port;
a second image output port;
a first processor coupled to the first control port;
a second processor coupled to the second control port;

wherein the first image processing resource is configurable to be controlled by the first processor to provide image data output for the first image output port; and wherein the second image processing resource is configurable to be controlled by the second processor to provide image data output for the second image output port.

6. The integrated circuit of claim 5, wherein the first image output port and second image output port are configurable to have independent resolution, refresh rate and timing parameters; and wherein the first image processing resource is configurable to be synchronized to the resolution, refresh rate and timing parameters of the first image output port and the second image processing resource is configurable to be synchronized to the resolution, refresh rate and timing parameters of the second image output port.

7. The integrated circuit of claim 1, further including:
a first image output port;
a first processor coupled to the first control port;
a second processor coupled to the second control port;
wherein the first image processing resource is configurable to be controlled by the first processor to provide first image data output for the first image output port; and wherein the second image processing resource is configurable to be controlled by the second processor to provide second image data overlaid on the first image data for the first image output port.

8. A method comprising:
allocating a first portion of image processing resources and a first set of interrupt request aggregation logic to a first processor, wherein the first portion of image processing resources comprises a first set of image processing pipelines configured to operate in parallel;
allocating a second portion of image processing resources and a second set of interrupt request aggregation logic to a second processor, wherein the second portion of image processing resources comprises a second set of image processing pipelines configured to operate in parallel;
receiving, by the first portion of image processing resources, first image data from the first processor;
receiving, by the second portion of image processing resources, second image data from the second processor;
overlaying, by the first portion of image processing resources, first image data to produce first image output data; and
overlaying, by the second portion of image processing resources, second image data to produce second image output data;
receiving, by the first set of interrupt request aggregation logic, a first interrupt request signal from a first image processing pipeline in the first set of image processing pipelines and a second interrupt request signal from a second image processing pipeline in the first set of image processing pipelines;
masking, by the first set of interrupt request aggregation logic, the first interrupt request signal;
aggregating, by the first set of interrupt request aggregation logic, the masked first interrupt request signal and the second interrupt request signal into an aggregated first set of interrupt request signals; and
communicating, by the first set of interrupt request aggregation logic, the aggregated first set of interrupt request signals to the first processor;

receiving, by the second set of interrupt request aggregation logic, a third interrupt request signal from a first image processing pipeline in the second set of image processing pipelines and a fourth interrupt request signal from a second image processing pipeline in the second set of image processing pipelines;
aggregating, by the second set of interrupt request aggregation logic, the third and fourth interrupt request signals into an aggregated second set of interrupt request signals; and
communicating, by the second set of interrupt request aggregation logic, the masked aggregated second set of interrupt request signals to the second processor.

9. The method of claim 8, further comprising allocating the first portion of image processing resources to the first processor while continuing to produce first image output data under direct control of the first processor and produce second image output data under direct control of the second processor.

10. The method of claim 8, further comprising restricting access to the second portion of image processing resources from the first processor and restricting access to the first portion of image processing resources from the second processor.

11. The method of claim 8, further comprising:
setting a security mode for the first portion of the image processing resources to secure mode while setting a security mode for the second portion of the image processing resources to unsecure mode; and
prohibiting movement of image data from the first portion of the image processing resource in secure mode to the second portion of the image processing resource in unsecure mode.

12. The method of claim 11, further comprising alerting a secure host coupled to the display system in response to an access attempt to the first portion of the image processing resources in secure mode by a non-secure host.

13. The method of claim 8, further comprising establishing a firewall with selected attributes associated with a first portion of the image processing resources, such that access to the first portion of the image processing resources is restricted to a requester with the selected attributes.

14. The method of claim 8, further comprising:
displaying the first image output data on a first display device coupled to the integrated circuit; and
displaying the second image output data on a second display device coupled to the integrated circuit.

15. The method of claim 8, further comprising:
displaying the first image output data on a first display device coupled to the integrated circuit; and
overlaying the second image output data on the first display device.

16. A method comprising:
allocating a first portion of image processing resources and a first set of interrupt request aggregation logic to a first processor;
allocating a second portion of image processing resources and a second set of interrupt request aggregation logic to a second processor;
receiving, by the first portion of image processing resources, first image data from the first processor;
receiving, by the second portion of image processing resources, second image data from the second processor;
receiving, by the first set of interrupt request aggregation logic, a first interrupt request signal from a first image processing pipeline in the first set of image processing pipelines and a second interrupt request signal from a second image processing pipeline in the first set of image processing pipelines;

masking, by the first set of interrupt request aggregation logic, the first interrupt request signal;

aggregating, by the first set of interrupt request aggregation logic, the masked first interrupt request signal and the second interrupt request signal into an aggregated first set of interrupt request signals; and communicating, by the first set of interrupt request aggregation logic, the aggregated first set of interrupt request signals to the first processor;

receiving, by the second set of interrupt request aggregation logic, a third interrupt request signal from a first image processing pipeline in the second set of image processing pipelines and a fourth interrupt request signal from a second image processing pipeline in the second set of image processing pipelines;

aggregating, by the second set of interrupt request aggregation logic, the third and fourth interrupt request signals into an aggregated second set of interrupt request signals; and communicating, by the second set of interrupt request aggregation logic, the masked aggregated second set of interrupt request signals to the second processor;

setting a security mode for the first portion of the image processing resources to secure mode while setting a security mode for the second portion of the image processing resources to unsecure mode;

prohibiting movement of image data from the first image processing resource in secure mode to the first image processing resource in unsecure mode;

establishing a plurality of firewalls with selected attributes associated with the first portion of the image processing resources, such that access to the first portion of the image processing resources is restricted to a requester with the selected attributes;

overlaying, by the first portion of image processing resources, first image data to produce first image output data;

overlaying, by the second portion of image processing resources, second image data to produce second image output data.

17. The method of claim 16, further comprising allocating the first portion of image processing resources to the first processor while continuing to produce first image output data under direct control of the first processor and produce second image output data under direct control of the second processor.

* * * * *